United States Patent Office 3,496,424
Patented Feb. 17, 1970

3,496,424
DIELECTRIC Nb AND Ta ELECTROLYTIC CAPACITORS AND METHOD OF PRODUCING THE SAME
Gunter Behrend, Heidenheim (Brenz), Germany, assignor to Siemens Aktiengesellschaft, Berlin, Germany, a corporation of Germany
Filed Feb. 7, 1968, Ser. No. 703,550
Int. Cl. H01g 9/00, 13/00, 9/05
U.S. Cl. 317—230                8 Claims

ABSTRACT OF THE DISCLOSURE

A method of producing insulating oxide layers which act as dielectrics on tantalum and niobium sintered electrode bodies whereby oxide layers are formed in low moisture containing glycol solution maintained at an elevated temperature of about 130° C. and having dispersed therein a chemically stable conductive salt, i.e. $KH_2PO_4$ during the application of a positive potential on the electrode bodies. A forming electrolyte low moisture-glycol solution having a conductivity greater than 0.5 ms./cm. especially about 1.5 ms./cm. and an electrolyte capacitor utilizing an tantalum and niobium sintered electrode body on which is produced dielectric oxide layers by anodization in such forming electrolyte solution is disclosed.

BACKGROUND OF THE INVENTION

The invention generally relates to forming tantalum and niobium electrode bodies and more particularly relates to an improved method of producing oxide layers having dielectric effect on tantalum and niobium electrode bodies in electrolyte condensers.

Present day production of oxide layers having dielectric effect on tantalum consists of utilization of "shaping baths" having phosphorous acid and glycol-water mixture heated to about 90° C. Generally, the maximum concentration of phosphorous acid in such a shaping bath is about 600 mol/kg. of solvent (i.e. glycol-water mixture). Attention is directed to German display copy number 1,178,275 for further details for this type of process.

Present day processes of the type above described leave much to be desired, as the extremely low conductivity of the shaping bath and extremely low water content therein do not facilitate the complete formation or shaping of the inner surfaces of large sintered electrode bodies during the time interval when no "grey" oxide forms. To overcome this drawback, present day procedure suggest that an additional intermediate formation or shaping be accomplished in a relatively high moisture containing electrolyte solution or shaping bath to obtain a more complete shaping of the inner surfaces of the electrode bodies. Of course, such additional formation is time consuming, non-economical and inefficient. In addition, such additional formation does not satisfactorily accomplish the desired results since incomplete formation is still evident.

It is therefore an object of the instant invention to overcome the aforesaid drawbacks of the present day processes of forming tantalum electrode bodies.

It is a further object of the invention to provide a method of economically and efficiently forming oxide layers on tantalum and niobium electrode bodies.

It is yet a further object of the invention to provide an improved method of completely shaping inner surfaces of large sintered tantalum and niobium electrode bodies in a single step without the formation of any "grey" oxides therein.

It is another object of the invention to provide an improved electrolyte bath for the formation of oxide layers having dielectric effect on tantalum and niobium electrode bodies thereby allowing complete formation of the inner surfaces of the electrodes in shorter periods of time.

Figure 1:
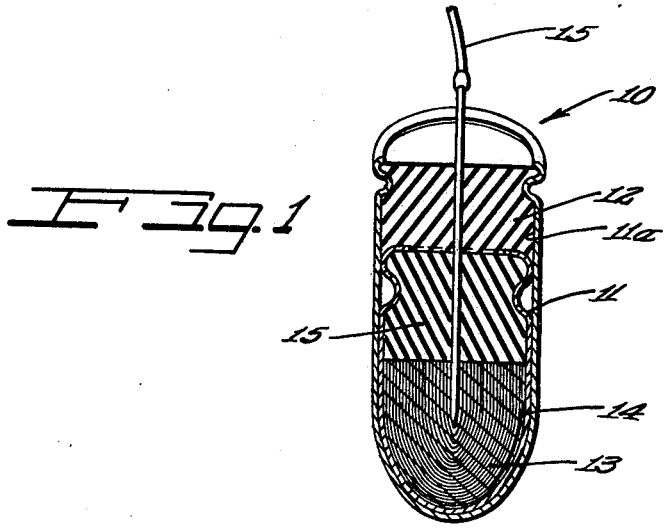
Figure 2:
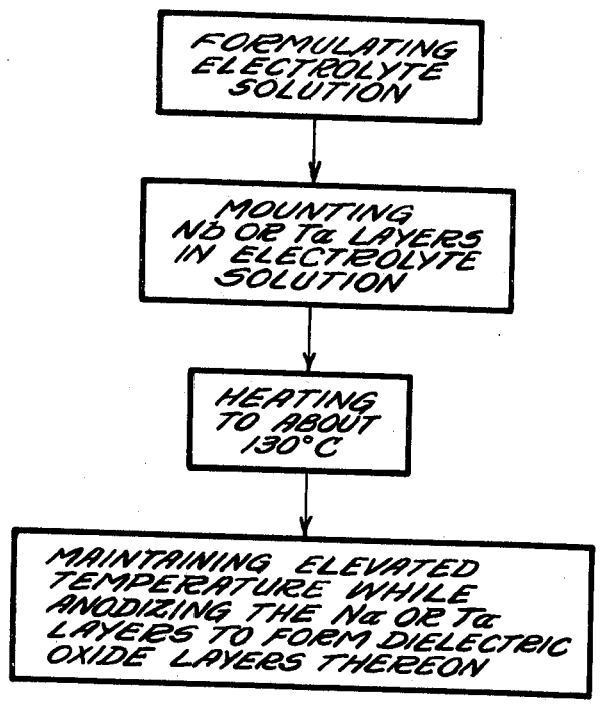

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure, and in which:

FIGURE 1 is an elevational diagrammatic view of an electrolytic capacitor constructed in accordance with the principles of the invention; and FIGURE 2 is a diagrammatic illustration of the process of the invention utilized to form the novel electrolytic capacitors.

In the process of the present invention, it has been unexpectedly discovered that a substantial increase of the shaping temperature results in an increase of the sparking voltage thereby allowing an increase of the shaping voltage. In order to accomplish such an increase of shaping voltage and specifically to allow the formation or anodization of inner surfaces of sintered electrode bodies within a relatively short period of time so as to prevent the formation of "grey" oxides, the invention process contemplates utilizing a shaping temperature of about 130° C.

T. L. Kolsky, in an article entitled "Electrolytic Capacitor Anodes Derived From Tantalum-Titanium and Niobium-Titanium Alloys" appearing in "Journal of the Electrochemical Society," March 1965, pages 272 et seq., suggests that surface-roughened tantalum electrodes can be formed at a temperature of 125° C. The forming electrolyte used is a substantially water-free solution of glycol containing ammonium and borate ions.

It had been discovered that when this type of process is utilized in the formation of sintered electrode bodies, an unsatisfactory product is obtained. The formation process above described must last several hours due to the insufficient conductivity of the electrolyte solution, i.e. 0.5 ms./cm. and the extremely low moisture therein. Such conditions tend to facilitate the eventual formation of "grey" oxides within the electrodes which is, of course, highly undesirable. Moreover, when the shaping temperature was increased to 130° C., a disintegration phenomenon of the above-described forming electrolyte occurred and fluctuations of the conductivity were noted.

In accordance with the principles of the present invention, it has now been surprisingly discovered that when a chemically stable salt, i.e. $KH_2PO_4$, is added as a conductive salt in a low moisture containing glycol electrolyte solution, exceptionally good results are obtained. Such an electrolyte solution has sufficient conductivity and sufficient moisture to facilitate the quick and easy formation of the inner surfaces of sintered electrode bodies without the anodization of any undesirable "grey" oxide therein. Further, the electrolyte solution is chemically stable at elevated temperatures, i.e. 130° C., and exhibits an exceptionally long useful life.

In the preferred electrolyte or formation solution of the instant invention, the glycol-water mixture consists of at least 90% glycol and at least about 5% but no more than 10% of water. The dihydrophosphate salt (although it will be appreciated that other chemically stable conductive salts may also be utilized) is added in an amount precalculated to yield a phosphate ion concentration within the range of about 0.2 to 0.04 mol/kg. of electrolyte solution.

A preferred phosphate ion concentration of 0.037 mol/kg. of electrolyte solution (containing the aforesaid proportions of glycol and water) yields a conductivity of 1.5 ms./cm. Such greatly increased conductivity is sufficiently adequate for the formation and/or shaping (i.e., anodization) of inner surfaces of sintered tantalum and/or niobium electrode bodies having diameters up to 6.2 mm. without encountering any difficulties.

The electrodes produced in accordance with the principles of the instant invention are utilized in electrolyte capacitors and other capacitors where semi-conductors, as for example, $MnO_2$, or some other solid body forms the counter-electrode. As will be appreciated, electrolyte and other electrical capacitors are provided with external connections through conventional insulators or bushings and are provided with means compensating for expansion and contraction of the electrolyte solution during temperature changes. These type of capacitors are noted for their high capacity and low losses.

Tantalum (Ta) and niobium (Nb) electrolyte capacitors are constructed in a conventional manner. As illustrated in FIGURE 1, an electrolytic capacitor 10 of the invention comprises a double metal case 11 provided with an inner chamber 11a that contains a bushing member 12 at one end of the chamber and a tantalum or niobium foil roll or sintered body 13 at the other end thereof with an insulating member 15 separating the bushing member 12 from the foil roll 13. The foil roll or sintered body 13 is connected with a lead wire 15 extending through the insulating and bushing members for connection with an appropriate circuit. The tantalum or niobium foil or sintered body 13 is mounted in and encompassed by the low moisture-glycol electrolyte solution 14 containing the chemically stable conductive salt of the instant invention. Such electrolytic capacitors are then appropriately subjected to the elevated temperatures previously discussed to obtain the quick and easy formation (i.e., anodization) of the insulating oxide layers on the tantalum or niobium foil surfaces (and without "grey" oxide formation) to allow proper function of said capacitors. Of course, during the maintenance of the elevated temperatures the capacitor is subjected to a positive potential to allow the anodization process to proceed in a well known manner.

FIGURE 2 illustrates in block form, the process of the invention utilized to form the electrolytic capacitors of the invention. The diagram is self-explanatory and no further explanation is necessary.

I claim as my invention:

1. A method of forming dielectric oxide layers on sintered electrode bodies containing materials selected from the group consisting of tantalum and niobium, wherein said layers constitute dielectrics in electrical capacitors, comprising (1) formulating a low moisture containing glycol solution, (2) mounting the electrode bodies in said solution containing a chemically stable conductive salt in an amount sufficient to yield a conductivity of more than 0.5 ms./cm. in said solution, (3) raising the temperature of said solution to about 130° C. and (4) maintaining said temperature while applying a positive potential to said bodies within the solution for a period of time whereby the oxide layers are relatively quickly and completely formed on the sintered electrode bodies.

2. The method as defined in claim 1 wherein the chemically stable conductive salt is $KH_2PO_4$.

3. The method as defined in claim 2 wherein the phosphate ion concentrate in the low moisture containing glycol solution is in the range of 0.02 to 0.05 mol/kg. of said solution.

4. The method as defined in claim 3 wherein the phosphate ion concentration in the low moisture containing solution is substantially 0.037 mol/kg. of said solution.

5. The method as defined in claim 1 wherein the low moisture containing glycol solution contains at least 90% glycol.

6. The method as defined in claim 1 wherein the low moisture containing glycol solution contains at least about 5% and not more than about 10% water.

7. A method of forming dielectric oxide layers on relatively large diametered sintered electrode bodies containing materials selected from the group consisting of tantalum and niobium, wherein said layers constitute dielectrics in electrical capacitors, comprising (1) preparing a solution containing at least 90% glycol, at least about 5% water and a chemically stable conductive salt in an amount sufficient to yield a conductivity greater than 0.5 ms./cm. in said solution, (2) mounting the bodies in said solution, (3) subjecting said solution to elevated temperatures to attain a temperature of about 130° C. in said solution and (4) maintaining said temperature in said solution while applying a positive potential to said bodies for a relatively short period of time whereby the oxide layers are quickly and completely formed on the sintered electrode bodies.

8. An electrolytic capacitor containing a material selected from the group consisting of tantalum and niobium comprising, housing means defining a capacitor body, bushing means disposed within said housing means at one end thereof, a sintered body composed of said material disposed within the housing means at the other end thereof, insulating means disposed within said housing means intermediate said bushing means and sintered body, a lead means directly communicating with said sintered body extending outside said housing through said bushing and insulating means, said sintered body having dielectric oxide layers on its surface, said oxide layer produced in an electrolyte solution consisting essentially of at least 90% glycol, at least 5% water and $KH_2PO_4$ in an amount sufficient to yield a phosphate ion concentration in said electrolyte solution ranging from 0.02 to 0.05 mol/kg. of said electrolyte solution, an electrolyte in contact with said dielectric oxide, and a cathode electrically connected with said electrolyte.

References Cited

UNITED STATES PATENTS

| | | | |
|---|---|---|---|
| 2,949,411 | 8/1960 | Beck | 204—56 |
| 3,196,111 | 7/1965 | Jackson | 317—230 X |
| 3,085,052 | 4/1963 | Sibert | 204—56 |
| 3,262,867 | 7/1966 | Callahan | 204—56 |
| 3,331,993 | 7/1967 | Brown et al. | 317—230 |
| 3,415,722 | 12/1968 | Scheller | 204—15 |

JAMES D. KALLAM, Primary Examiner

U.S. Cl. X.R.

204—56; 252—62.2

UNITED STATES PATENT OFFICE
CERTIFICATE OF CORRECTION

Patent No. 3,496,424          Dated February 17, 1970

Inventor(s) Gunter Behrend

It is certified that error appears in the above-identified patent and that said Letters Patent are hereby corrected as shown below:

Column 2, line 52 replace "formation" with --anodization--;
             line 54 replace "anodization" with --formation--.

Signed and sealed this 15th day of June 1971.

(SEAL)
Attest:

EDWARD M. FLETCHER, JR.          WILLIAM E. SCHUYLER, JR.
Attesting Officer                 Commissioner of Patents